Oct. 23, 1962   D. W. MOYER ETAL   3,059,717
POWER STEERING APPARATUS
Filed June 30, 1960   9 Sheets-Sheet 1

Inventors:
Donald W. Moyer
George T. Fiala

Oct. 23, 1962

D. W. MOYER ET AL 3,059,717

POWER STEERING APPARATUS

Filed June 30, 1960

Inventors:
Donald W. Moyer
George T. Fiala
Paul O. Pippel
Atty.

3,059,717
Patented Oct. 23, 1962

3,059,717
POWER STEERING APPARATUS
Donald W. Moyer, Chicago, and George T. Fiala, Downers Grove, Ill., assignors to International Harvester Company, Chicago, Ill., a corporation of New Jersey
Filed June 30, 1960, Ser. No. 39,893
7 Claims. (Cl. 180—79.2)

This invention relates generally to vehicle steering apparatus, but more particularly it is concerned with hydrostatic steering means of the type wherein there is no operative mechanical connection between the operator's steering or control wheel and the steerable wheels of the vehicle.

The use of hydrostatic or full fluid power direct acting steering means to effect turning or steerable control of a vehicle is not new, since prior devices to accomplish such an objective have, heretofore, been proposed and employed with various types of vehicles. The success of such prior devices, however, leaves something to be desired particularly insofar as providing "reversibility" and compensating for "kick-back" are concerned. The term "reversibility," as it is understood in the industry, relates to the ability of a steering assembly to give or yield when subjected to certain types of slight or gradual loads resulting from road shock and then to be able to return the steerable wheels, by virtue of the self-centering geometric characteristics resulting from castoring of the steering assembly, to a straight-ahead or neutral position. The term "kick-back" is usually applied to connote a similar action resulting from a heavy, rapidly applied shock load, which unless properly cushioned, opposed or dampened-out, places an excessive stress on the assembly that may cause damage to the steering mechanism.

An important feature of the present invention, therefore, is concerned with providing a hydrostatic or full fluid power steering assembly that will have the faculty for providing the feature known as reversibility, while additionally being capable of providing compensating or relief means whereby the mechanism may cushion, oppose or dampen out the effects of kick-back therein resulting from the more severe road shocks occasionally encountered by a vehicle.

A primary object of the invention is to provide a simplified, effective and improved hydrostatic steering assembly that is highly adaptable for use with agricultural tractor vehicles.

Another object of paramount importance is to provide a full fluid power vehicle steering assembly having a control valve therein that is operable to direct fluid under pressure selectively to opposite ends of a reciprocating type fluid motor to effect turning of the steerable wheels of the vehicle, and wherein the fluid passages through said control valve unit are arranged so that when said control valve is in a neutral position, regardless of the relative position of the steerable wheels, the opposite ends of said fluid motor are in free fluid communication with one another whereby any fluid displaced from one side of said motor, as a result of any external momentary turning force on the steerable wheels, is transmitted to the opposite end of said motor and when said force is relieved, said displaced fluid is returned to the motor end from whence it was displaced, said return action being aided by operation of the conventional geometric design characteristics of castoring which operates to self-center the wheel supporting mechanism of the vehicle.

Another object is to provide a novel rotatable spool and sleeve hydraulic fluid control valve of the type having registerable fluid passages in said elements and wherein limited rotational movement of the sleeve relative to the spool is permitted for effecting control of the hydraulic fluid directed therethrough and thereafter selectively directing the fluid to opposite ends of a hydraulic cylinder for turning the steerable wheels of a vehicle.

A further object is to provide an improved hydraulic steering control unit comprising in combination a rotatable fluid control valve and a mechanically interconnected hydraulic metering motor device which is alternatively operative, upon manual rotation thereof by an operator's control wheel, as a hydraulic pump for providing hydraulic pressure to effect the turning of a vehicle steerable wheel assembly upon failure of the source of hydraulic pressure of the vehicle.

Another important object is to provide in a hydrostatic or full fluid power steering assembly improved means for effecting a cushioning of heavy, fast-acting road shocks thereon and for permitting effortless self-centering of a vehicle following the subjection of the steerable wheels thereof to a slight or gradual acting road shock.

The foregoing and other objects and advantages are attained by the present invention, various novel features of which will be apparent from the description herein and the accompanying drawings disclosing a preferred embodiment of the invention, and will be more particularly pointed out in the appended claims.

Referring now to the drawings, where there is depicted one preferred embodiment of the invention, it will be noted the invention has been shown employed in association with a steerable front wheel assembly, indicated generally by the reference character 10, of a vehicle such as a tractor (not shown) although it will be apparent that its use is not limited to such a specific vehicle application. A suitable source of fluid pressure may be provided by a hydraulic pump, which may be any well-known construction or make such as the conventional gear type illustrated generally at 11, that, in turn, communicates by conduit 12 with a hydraulic fluid reservoir 13 and by conduit 14 with the inlet of a control unit, indicated in its entirety at 15, that includes a valve portion 15A and a hydraulic motor portion 15B, while a return conduit 16 extends between the said reservoir and the outlet of said control unit. One of the work ports of said control unit communicates by way of conduit 17 with one end chamber 18 of a wheel turning reciprocating type hydraulic servomotor 19 while another work port of said control unit communicates by way of conduit 20 with an opposite end chamber 21 of said motor.

The hydraulic servo-motor 19, which may be of the conventional reciprocating or ram-type construction, comprises a cylinder 22 closed at both ends and having a double-ended piston 23 slidably positioned therewithin that is provided with a rack-type gear 24 fashioned on one side thereof which is maintained in meshing engagement with a pinion gear 25, in turn, mounted on and for movement with steerable wheel assembly 10, all of which, in turn, may be suitably mounted on a vehicle (not shown). It will be understood, of course, that the wheel-turning hydraulic servo-motor 19 will be so mounted and fixedly supported by the vehicle that when fluid pressure is introduced into either end chamber of the cylinder 22 thereof the reaction will be effective for axially sliding the piston 23 and causing the desired turning of the steerable wheel assembly. It will, also, be understood that the steerable wheel mounting assembly will be fashioned to provide castor therein in accordance with conventional and well-known practices in such structures. Since it would serve no useful purpose to illustrate and show such well-known elements, the details of the assembly have been omitted in the intereset of providing greater clarity and simplicity in the drawings.

The control unit 15 may be fabricated with a body or casing having a center section 26, an adjoining first intermediate section 27, a second intermediate section 28 adjacent said first section, and respective end sections 29 and 30 removably affixed to said second intermediate and center sections by suitable securing means such as the bolts 31 and 32, while conventional liquid seals, such as the O-ring indicated at 33 and 34, may be positioned between the juxtaposed sections to prevent fluid leakage therefrom. It will be understood, of course, that suitable means (not shown) will be provided for securely mounting said control unit on the vehicle with which it is associated.

Figure 1:
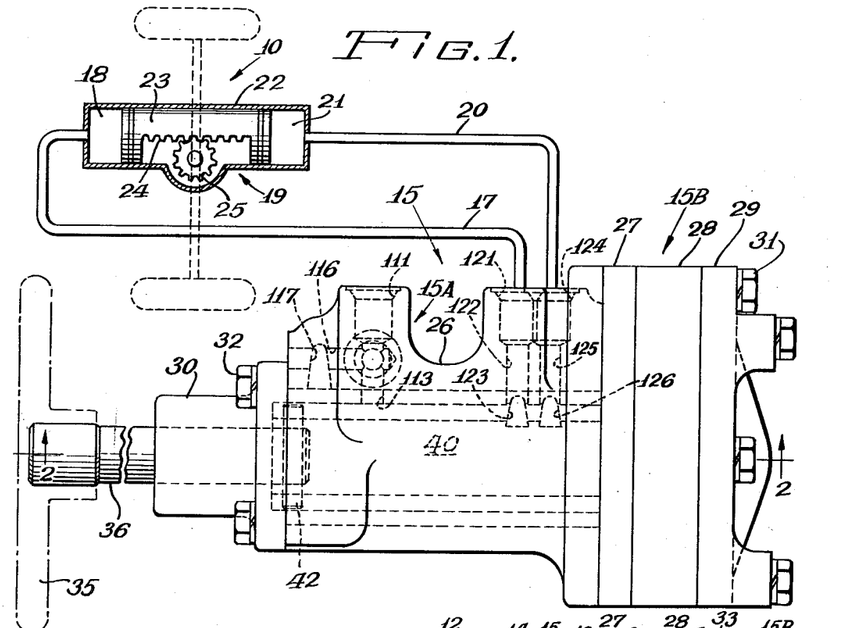
FIG. 1 is a plan view of the proposed control valve unit shown schematically in association with a vehicle's front wheel steering assembly.
Figure 2:
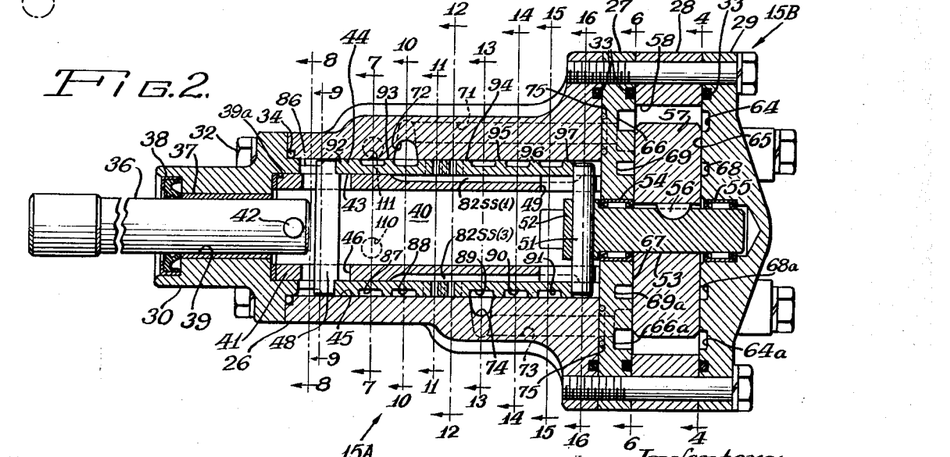
FIG. 2 is a longitudinal vertical sectional view of the control valve unit taken on line 2—2 of FIG. 1.

An operator's control or hand wheel 35 is fixedly mounted on one end of a shaft 36, journalled by the liner bearing 37 and sealed by a fluid seal 38 in a bore 39 fashioned in the end casing section 30, that extends in overlapping relationship into a hollow interior 40 of a valve spool member, indicated generally at 41, and a pin 42 disposed transversely through said shaft and into suitable radial anchoring openings in the valve spool serves to operatively interlock said spool and shaft members for movement with one another. One end of spool 41 is loosely received in an enlarged bore portion 39a of the end casing section 30 and the remaining portion of said spool extends axially therefrom and is fitted closely into an axial bore 43 formed in a valve sleeve member, indicated generally at 44, while said sleeve, in turn, is rotatably positioned in an axial bore 45 provided in the center casing section 26. The lefthand portion of spool 41 (as viewed in FIGURES 2 and 3) has an axially extending slotted opening 46 that cuts radially through both walls thereof and is disposed so as to be alignable with a slot-like recess 47 (FIG. 3) extending axially inwardly from an adjacent end edge thereof in both walls of the valve sleeve 44, and a laminated leaf spring, such as indicated at 48 (FIGS. 2 and 9), fashioned from a plurality of individual spring members arranged in two oppositely positioned groups, extends radially through both of said slotted openings and into both of said slotted recesses to resiliently interlock said sleeve and spool normally in a neutral position as will be subsequently further described. The relative circumferential widths of these respective slot-like recesses and openings are dimensioned so as to permit a relative rotation of approximately eight degrees in either direction of rotation between said spool and sleeve elements. The opposite end of said spool is provided with an enlarged slotted recess 49 extending inwardly from the end edge thereof while the respective end of said sleeve has a similar axially slotted recess 50 of somewhat smaller circumferential and longitudinal dimensions than the spool recess and is disposed in radial alignment with the proximate spool recess. A transversely positioned pin 51 dimensioned to fit closely within the circumferential dimensions of the slotted sleeve recess 50 and loosely in the spool recess 49 is anchored in a boss 52 in a shaft 53 that, in turn, is journalled at 54 in the first intermediate casing section 27 and at 55 in the end casing section 29. Mounted on the shaft 53, as by the key 56 or other suitable means, is a vane rotor unit 57 forming part of the hydraulic motor 15B which, it will be appreciated, is constrained to rotate with the sleeve 44 and vice versa.

Figures 4, 5, 5A:
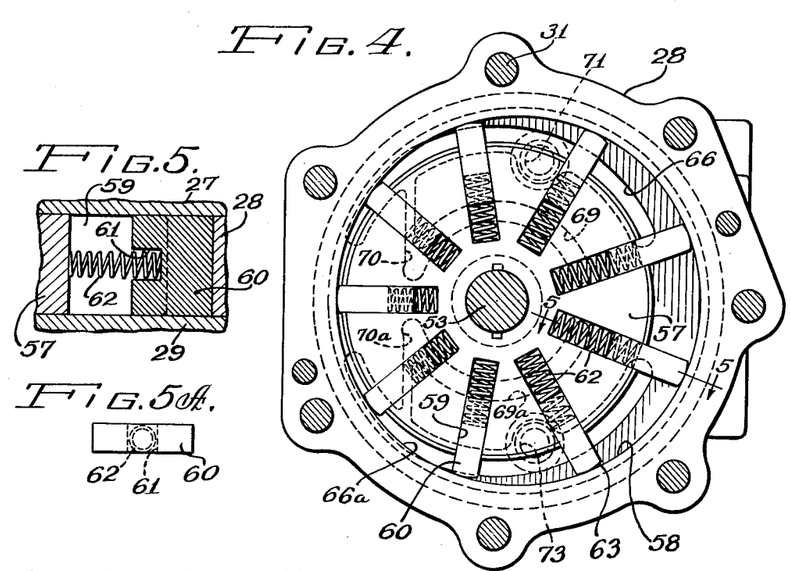
FIG. 4 is a vertical sectional view taken on line 4—4 of FIG. 2.
FIG. 5 is a fragmentary longitudinal sectional view taken on line 5—5 of FIG. 4.
FIG. 5a is an end elevational view of the vane element shown in FIG. 5.

The second intermediate casing section 28 is fashioned with a bore 58 the center of which is radially displaced from the axis of the vaned rotor 57 so that the clearance between the peripheral surface of said rotor and the interior surface of said bore varies throughout the circumferential extent of the rotor as best seen in FIG. 4. A plurality of nine equally spaced slot-like openings 59 provided in the peripheral surface of the rotor extend the full axial length thereof and are dimensioned to slidably receive a vane-like member, such as 60, positioned therewithin. A slot, such as 61 (FIG. 5), in each vane member is dimensioned to receive a coil spring, such as 62, which reacts between the bottom of rotor slot 59 and the bottom of the slot in the individual vane member 60 to normally urge said vane radially outwardly into close fitting relation with the surface of eccentric bore 58. The outer peripheral surface edge of each vane member may be slightly arched or curved convexly, as indicated at 63 (FIG. 4), to provide generally tangential contact between each vane and the surface of the eccentrically fashioned bore 58.

Figure 6:
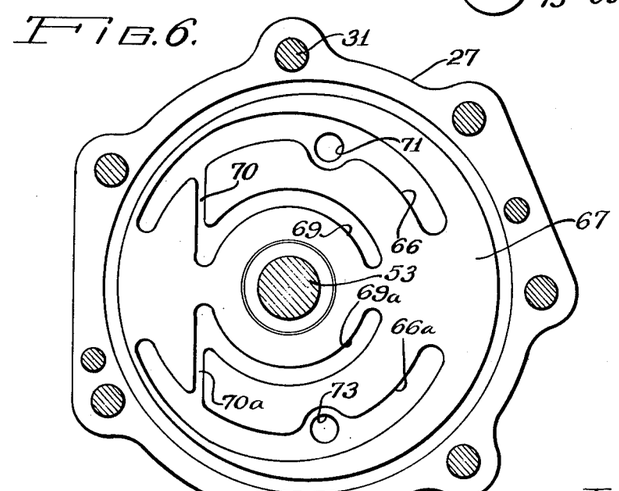
FIG. 6 is a vertical sectional view taken on the line 6—6 of FIG. 2.

A pair of semi-circular radially outwardly positioned grooves or recesses 64 and 64a, arranged one on one side of the rotor axis and one on the other side thereof in the innerface 65 of the casing end section 29, are disposed in axial alignment with a pair of similarly arranged grooves 66 and 66a formed in the face 67 of the first intermediate section 27 (FIGS. 2 and 6), while a pair of radially inwardly disposed but similarly arranged grooves or recesses 68 and 68a provided in the same face of said end section are disposed in axial alignment with a similarly arranged pair of grooves 69 and 69a in the inner face of said first intermediate section, and a pair of vertically disposed passages 70 and 70a (FIG. 6) in said latter intermediate section provide fluid flow means for communicatively interconnecting the outer grooves 66, 66a with the respective inner grooves 69, 69a for purposes of conveying or transmitting fluid from one side of the vane member to the other side thereof as will be better understood as the description proceeds. Although the radially displaced inner grooves 69, 69a are illustrated as being fashioned in the form of two separated semi-circular grooves it will be appreciated that these could readily be fashioned as one full circular groove instead of as shown without departing from the spirit of the present invention. The upper outer groove 66 opens into an axially extending passage 71, the opposite end of which opens into an enlarged outwardly flaring recess 72 in the center casing section 26, while the lower outer groove 66a opens into an axially extending passage 73 that, in turn, opens into a similarly arranged enlarged outwardly flaring recess 74 that opens into the interior of bore 45 of said center casing section. O-ring oil seals, such as shown at 75, may be used where the passages 71 and 73 extend across the break between the center casing section 26 and the adjacent first intermediate section 27.

Figures 14, 15, 16:
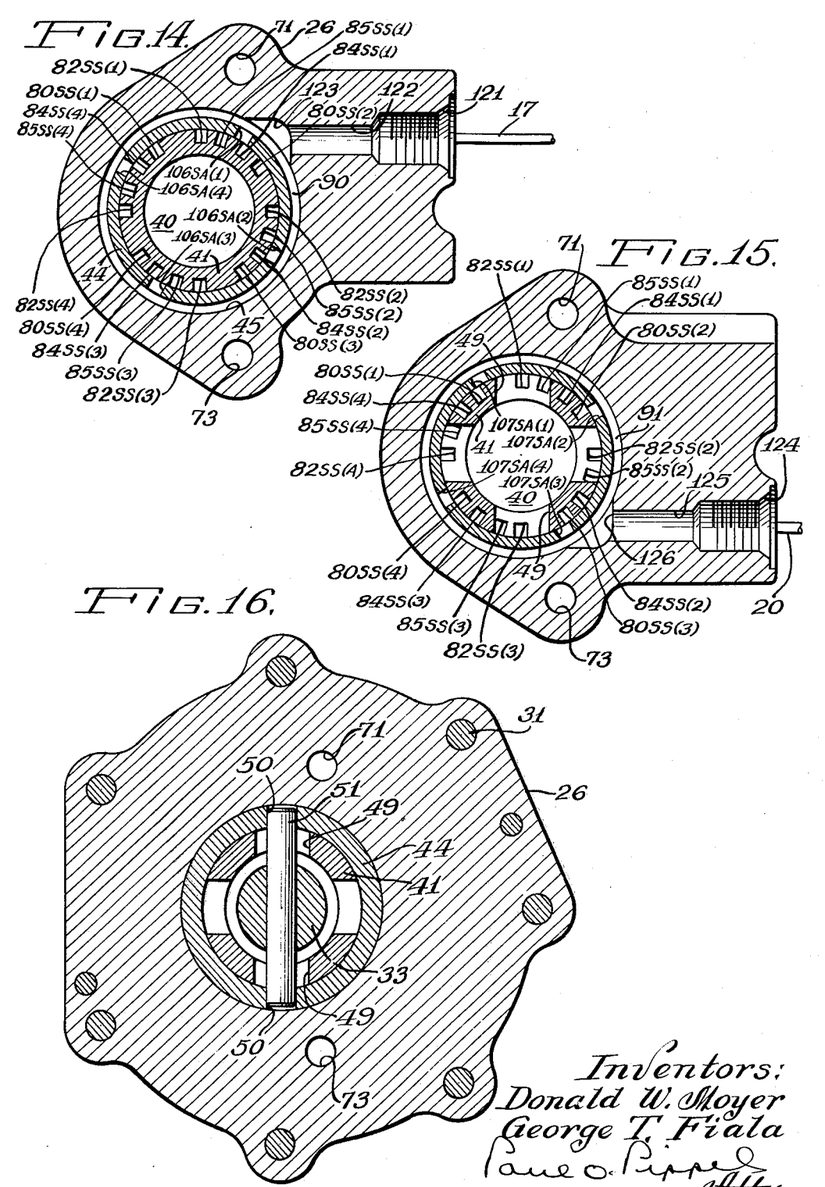

The valve spool 41 is fashioned with a plurality of longitudinally extending slots formed in the outer surface thereof which provide fluid passage communication means between predetermined openings in the valve sleeve 44 or between said openings and the hollow interior 40 of said spool. These passage means are arranged so that each such individual means includes a set of four similarly formed parallel slots or channels circumferentially spaced an equidistance from one another on the outer periphery of the valve spool. For instance, the first passage means, represented generally by the reference numeral 80SS (FIG. 3), the SS suffix designation being used to indicate a valve spool slot that forms part of the referenced fluid passage means, will be seen to include (FIG. 10) four parallel and equally spaced identical slot-like channels designated respectively, as 80SS(1), 80SS(2), 80SS(3) and 80SS(4). Adjoining said first passage means is the second passage means 81SS which includes channels 81SS(1), 81SS(2), 81SS(3) and 81SS(4) and next adjoining the latter, reading in clockwise order, are the third (82SS), fourth (83SS) and fifth (84SS) passage means, respectively, including the parallel slot-like channels designated 82SS(1), 82SS(2), 82SS(3), 82SS(4), 83SS(1), 83SS(2), 83SS(3), 83SS(4) and 84SS(1), 84SS(2), 84SS(3) and 84SS(4). A sixth passage means 85SS (FIG. 3), including the slot-like channels 85SS(1), 85SS(2), 85SS(3) and 85SS(4) (FIGS. 14 and 15), is in axial alignment with but not communicatively connected to the fourth passage means 83SS.

Figure 3:
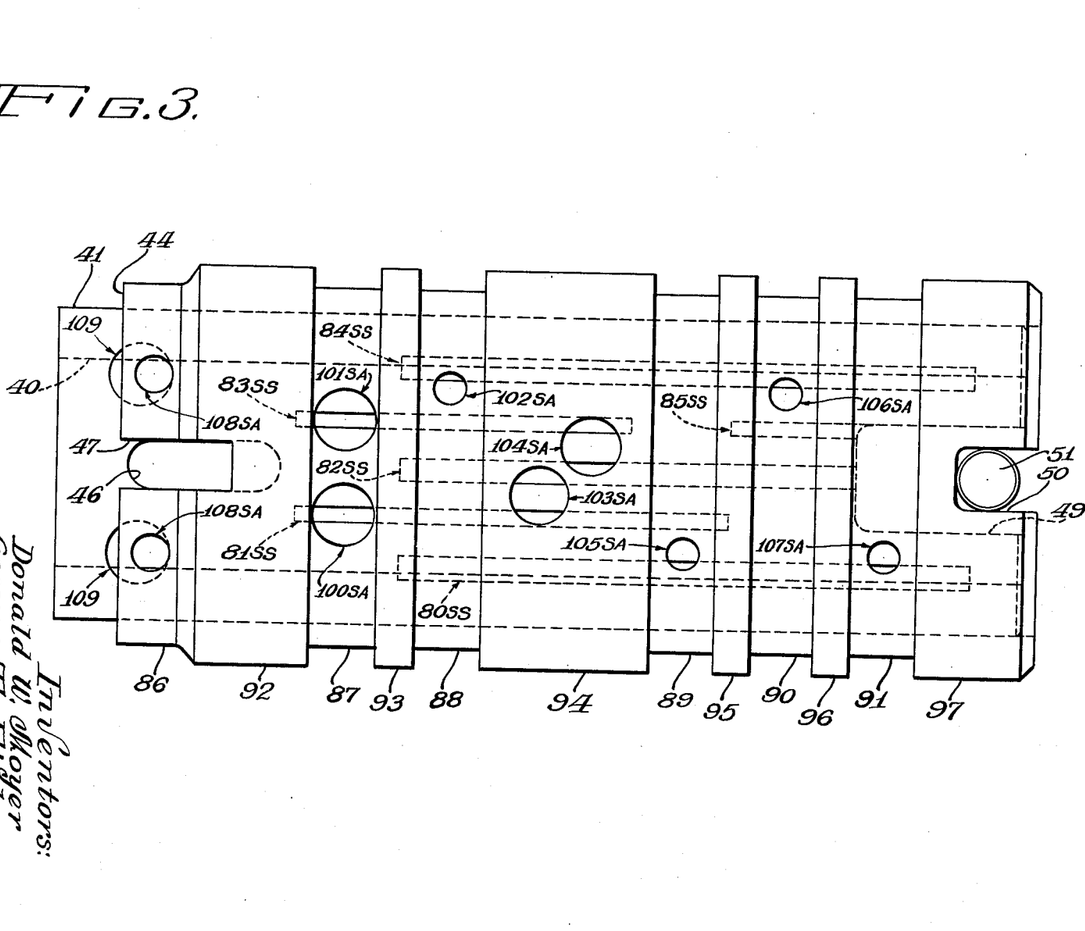
FIG. 3 is a plan view shown in enlarged dimensions of the sleeve and spool elements of the proposed unit but showing only one each of the set of four of the different radial openings and longitudinal passages provided therein for directing fluid flow through the unit.
Figures 7, 8, 9:
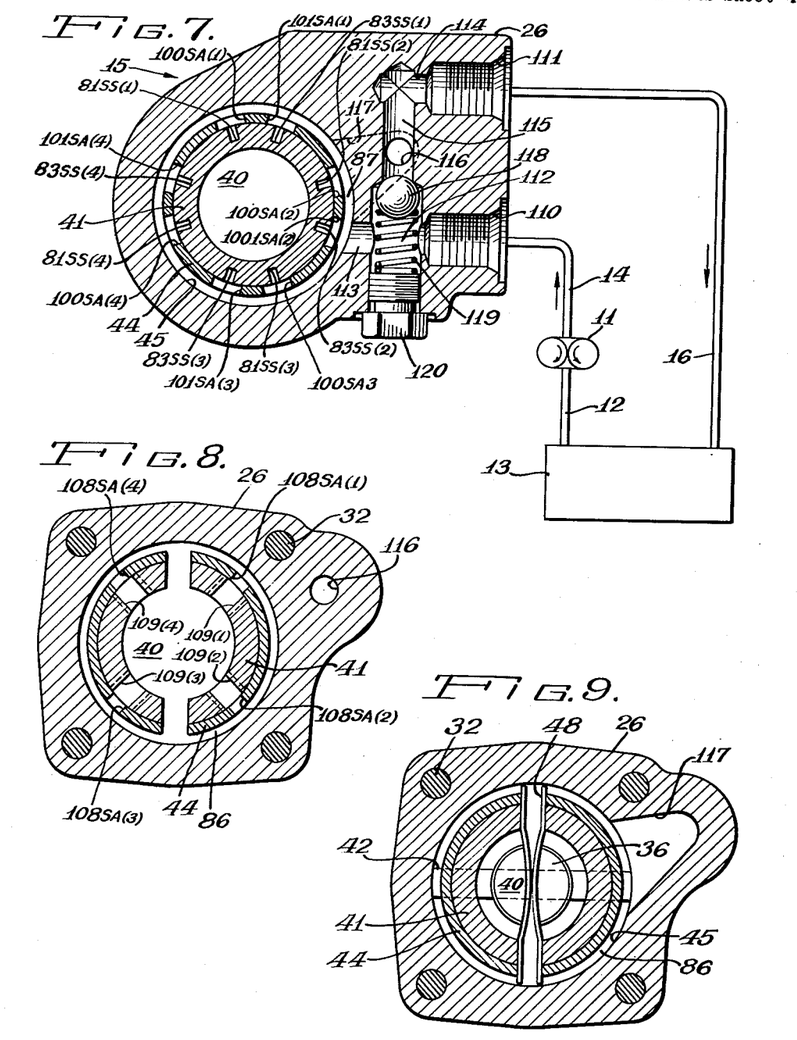
FIG. 7 is a vertical sectional view taken on the line 7—7 of FIG. 2, and additionally showing schematically a source of fluid pressure connected thereto.
FIGS. 8–16 are vertical sectional views taken on the respectively indicated lines of FIG. 2.
Figures 10, 11:
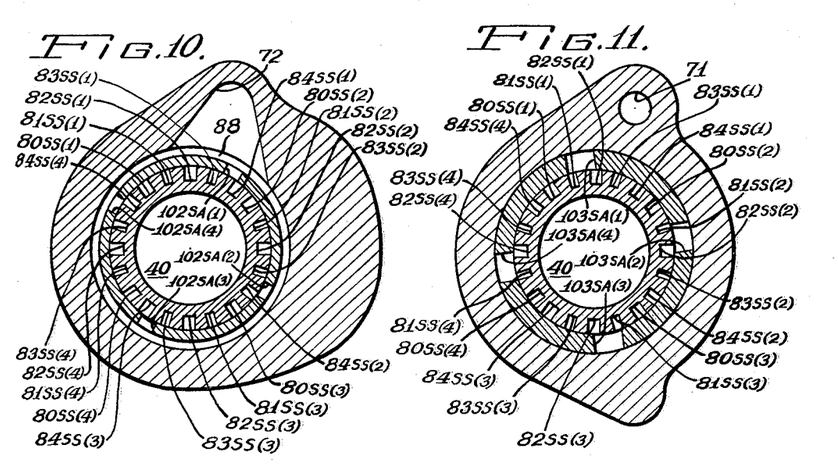
Figure 12:
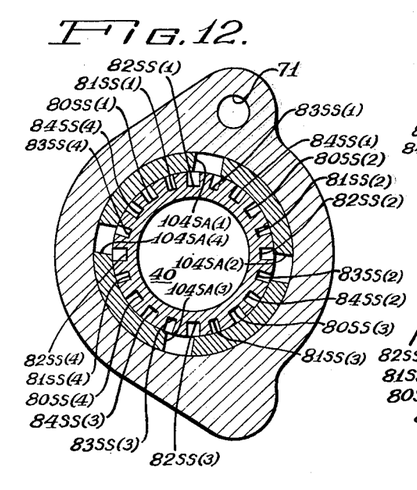
Figure 13:
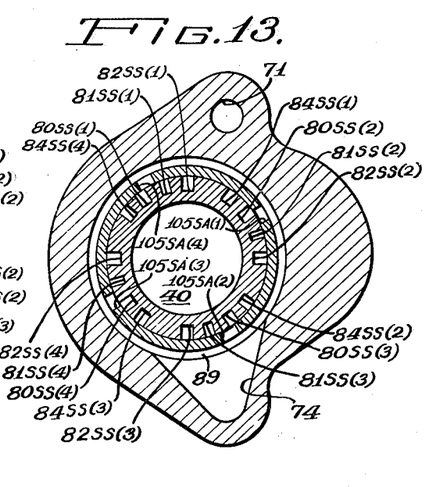

The valve sleeve 44 is fashioned to provide (see FIG. 3) six annular grooves designated 86, 87, 88, 89, 90 and 91 with six adjoining lands 92, 93, 94, 95, 96 and 97 arranged in association therewith as indicated. Said sleeve is further provided with a plurality of radial openings fluid passage means which are coordinated position-wise with the cooperating spool-slot passage means previously described, and each such radial passage means includes four similarly formed radial apertures or openings circumferentially spaced an equidistance from one another around the surface of the sleeve. Referring first to FIGS. 3 and 7 it will be seen that the first radial openings passage means, designated as 100SA, the said suffix designation being used throughout to indicate the radial apertures in the sleeve that are associated with the respective passage means therethrough, includes radial openings 100SA(1), 100SA(2), 100SA(3) and 100SA(4) while the second passage means 101SA includes openings 101SA(1), 101SA(2), 101SA(3) and 101SA(4). Referring next to FIG. 10 it will be seen that the third radial passage means 102SA includes openings 102SA(1), 102SA(2), 102SA(3) and 102SA(4), and FIG. 11 illustrates the fourth passage means 103SA that includes openings 103SA(1), 103SA(2), 103SA(3) and 103SA(4), while FIG. 12 shows openings 104SA(1), 104SA(2), 104SA(3) and 104SA(4) of the fifth passage means 104SA. Continuing with these means FIGURE 13 shows the sixth fluid passage means 105SA including openings 105SA(1), 105SA(2), 105SA(3), and 105SA(4), while in FIG. 14 will be seen openings 106SA(1), 106SA(2), 106SA(3), and 106SA(4) of the seventh passage means 106SA, and in FIG. 15 the openings 107SA(1), 107SA(2), 107SA(3) and 107SA(4) designate the eighth passage means 107SA, and in FIG. 8 the openings 108SA(1), 108SA(2), 108SA(3) and 108SA(4) designate the ninth passage means 108SA. An additional radial passage means in the spool, as shown in FIG. 8 and designated 109, includes the openings 109(1), 109(2), 109(3) and 109(4).

The conduit 14 which communicates with the outlet of the source of hydraulic pressure, i.e. the hydraulic pump 11, is connected at its opposite end into the inlet or pressure port opening 110 of the valve portion 15A of the control unit 15, while the conduit 16 from the fluid reservoir 13 is connected at its opposite end into the outlet or exhaust port opening 111 of the valve portion of said unit. The inlet port 110 of this valve unit portion opens into one side of a passage 112 disposed transversely relative to said port while the diametrically opposite side of said latter passage connects with a short passage 113 that communicates with the interior of the bore 45 and is disposed in alignment with the groove 87 of sleeve 44. The outlet port 111 of said valve unit portion opens into a short passage 114 which, in turn, opens into a passage 115 that constitutes a continuation of the transverse passage 112, while a further passage 116 connects into passage 115 and extends axially through the center casing section 26 parallel to the bore 45 therein and opens into a flared recess 117 that communicates with the interior of said bore at a position in alignment with groove 86 of the sleeve 44. A ball valve member 118 disposed in passage 112 is normally resiliently seated against a portion of the bottom of said latter passage by a spring 119 which, in turn, seats at its opposite end against a closure plug 120 threadably secured in an opening in the center casing section 26. This ball valve, as thus arranged normally restricts fluid communication between said inlet and outlet ports but may permit fluid flow therebetween when the pressure in the exhaust or outlet port exceeds that in the inlet or pressure port as it will be better understood as the description proceeds.

The conduit 17 which connects at one end with one chamber of the reciprocating hydraulic servo-motor 19 is connected at its opposite end to the upper work or motor port 121 which opens into a passage 122 that, in turn, opens into a flared recess 123 that communicates with the interior of the bore 45 at a point in alignment with the groove 90 in sleeve 44, while the conduit 20 connected to the other end chamber of said hydraulic servomotor connects at its opposite end to the lower work or motor port 124 which opens into a passage 125 that, in turn, opens into a flared recess 126 that communicates with the interior of the bore 45 at a point in alignment with the groove 91 in said sleeve.

OPERATION

*Neutral Position (External Hydraulic Pressure Available)*

Figure 17:
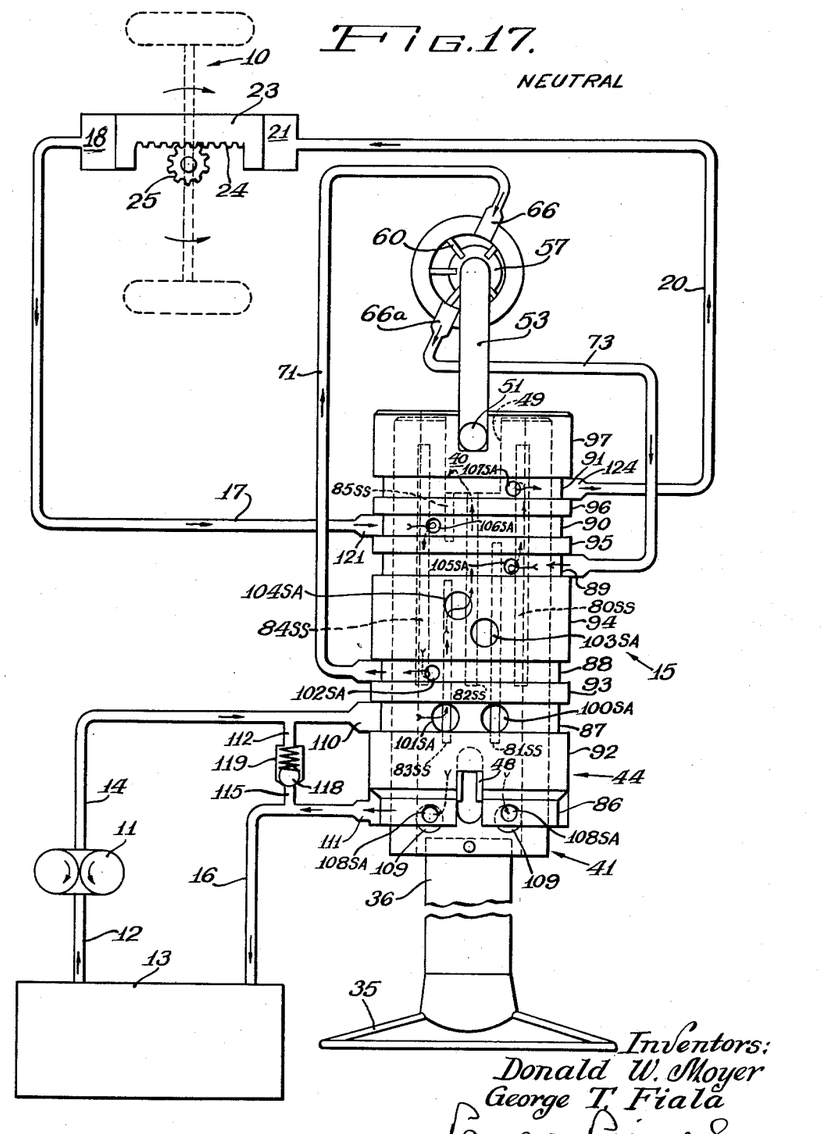
FIGS. 17–19 are schematic representations of the complete power steering assembly and showing fluid flow paths under various operating positions of the control unit and the steering assembly.

Assume first that the hydraulic gear pump 11 is operating to supply fluid under pressure to inlet port 110 of the valve unit 15A and that the sleeve and spool elements thereof are in a neutral position while the steerable wheels are in a straight-ahead position. Referring to FIGURE 17, which schematically illustrates the relative position of the various components in this condition, it will be seen that the fluid flow from the pump 11 will pass freely through the inlet port 110 into sleeve groove 87 thence through radial opening passage means 101SA into the longitudinal spool passage means 83SS and radial openings passage means 104SA into spool passage means 82SS the enlarged slot 49 and thereafter through the hollow center 40 of spool 41 to radial openings 109 and passage means 108SA into sleeve groove 86 and outlet port 111 and then, by way of conduit 16, back to the reservoir 13 without disturbing the position of the steerable wheels. When the wheels are in this straight-ahead position, and the valve is in its neutral position fluid is trapped in the hydraulic circuit that includes the hydraulic cylinder chamber 18, conduit 17, work port 121, sleeve groove 90, radial openings passage means 106SA, spool passage means 84SS, radial openings passage means 102SA, sleeve groove 88, passage 71, rotor unit 57, passage 73, sleeve groove 89, radial openings passage means 105SA, spool passage means 80SS, radial openings passage means 107SA, sleeve groove 91, work port 124, conduit 20, and the hydraulic cylinder chamber 21.

Because of the unique characteristics of the proposed control valve unit when the input shaft 36, upon which is mounted the operator's control wheel, is held against rotation by the operator and a heavy or severe shock load is applied to the rotor unit 57, by way of the hydraulic conduits connected to the reciprocating fluid motor 19, such action tends to rotate the rotor 57 and hence the sleeve 44 relative to the spool 41 which rotation either causes the conduits 17 and 20 to be blocked off or pressurized depending upon the direction of turn. This action, in turn, serves to combat the shock load by compensating in-flow of fluid pressure in an opposite direction thus dampening out or preventing the effect of kickback, which, in effect, is a heavy fast operating shock action, on the input shaft 36. In the neutral position of said valve and a straight ahead position of the wheel assembly, when a slight or gradual load is put on the steerable wheels of the vehicle and then transmitted by the interconnecting circuit to the rotor unit 57, this will operate to permit rotation of both sleeve 44 and spool 41 if shaft 36 is not held against rotation thereby giving reversibility to the mechanism. This is possible because the fluid trapped in the hydraulic circuit, as indicated, will be able to flow from one chamber of the hydraulic servo-motor 19 through said circuit to the other chamber thereof to relieve the effect of such shock load, and thereafter, when the force from said load has been relieved, the castor characteristics of the steering assembly will be effective for returning the steerable wheels to a straight-ahead position, while the spring 48 tends to urge the sleeve and spool elements of the valve into a neutral position.

*Right Turn (External Hydraulic Pressure Available)*

Figure 19:
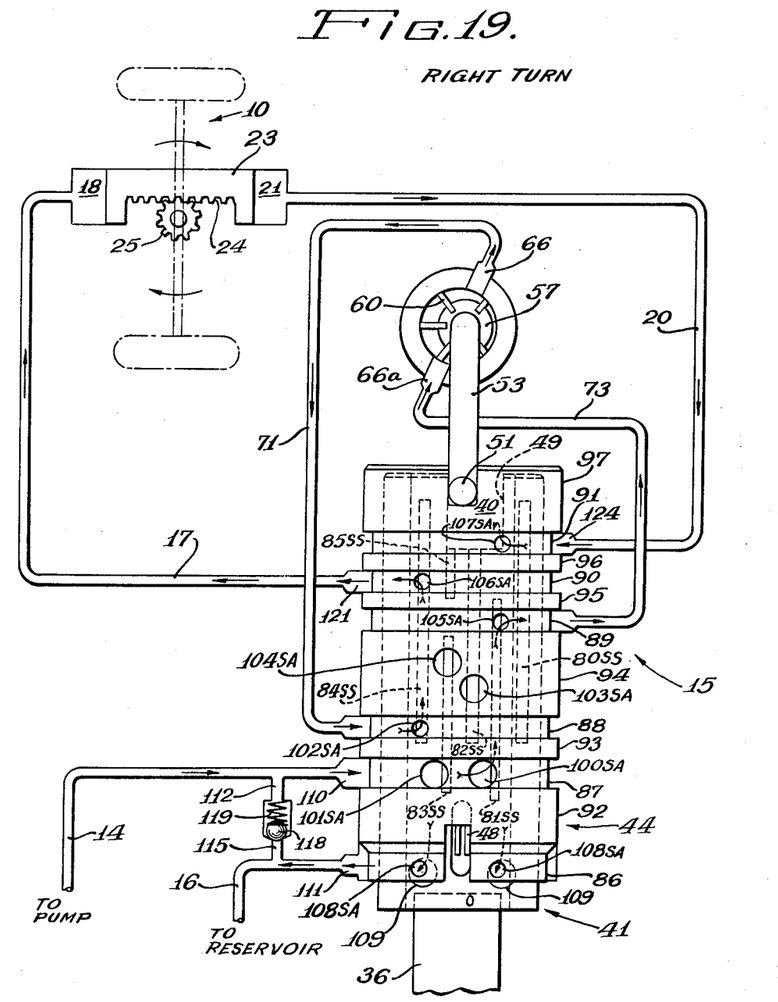

Assume now that hydraulic pressure is still available from gear pump 11 and that a right turn of the steerable wheels is desired, whereupon a turning of the operator's control or hand wheel 35 will rotate the connected shaft 36 which, by means of pin 42, then rotates the spool 41 clockwise and starts to load the leaf spring 48 so that after a rotation of approximately eight degrees by the spool said spring is loaded against the sleeve 44 which, in such position, is constrained against rotation because of the rotor unit 57 that is operatively connected thereto by the pin 51 and shaft 53. In this instance the relative position of the various communicating passages and radial openings in the sleeve and spool will have been changed from the neutral position thereof and will assume the relationship illustrated schematically in FIG. 19, subsequent, of course, to completion of the initial eight degree movement thereof. Referring now to FIG. 19 it will be seen that fluid flow from inlet port 110 is directed into sleeve groove 87 and through radial openings passage means 100SA into spool passage means 81SS, thence through radial openings passage means 105SA into sleeve groove 89 and passage 73 into rotor unit 57, where the pressure starts to build up until it becomes sufficient to start rotation of said rotor. As the rotor 57 is rotated fluid under pressure is discharged from the opposite side thereof through the passage 71, sleeve groove 88, radial openings passage means 102SA, spool passage means 84SS, radial openings passage means 106SA, sleeve groove 90, work port 121, and conduit 17 into hydraulic cylinder chamber 18 thereby causing the piston 23 therein to slidably move and, through the rack gear 24 and meshing gear 25, to effect a turning of the steerable wheels assembly 10 in a clockwise direction as desired. As said piston slidably moves in the cylinder 22 fluid is displaced out of chamber 21 and conducted by way of conduit 20 successively through work port 124, sleeve groove 91, radial openings passage means 107SA, the hollow interior 40 of spool 41, and through openings 109 and radial openings passage means 108SA into sleeve groove 86 and then the exhaust port 111 and conduit 16 back to the reservoir 13. As the rotor 57 is rotated, it carries with it the sleeve 44 which, when rotated relative to the spool 41, serves to unload the leaf spring 48, whereupon such relative movement between said valve elements operates to rearrange the relative positions of the longitudinal passages and radial openings in said spool and sleeve members so that the work ports 121 and 124 are communicatively interconnected with one another through the hydraulic circuit that includes the rotor unit 57 and the neutral position of the control valve unit is thereby reestablished. Further clockwise turning of the operator's hand wheel 35 will, of course, effect a repetition of the sequence of operations just outlined.

*Left Turn (External Hydraulic Pressure Available)*

Figure 18:
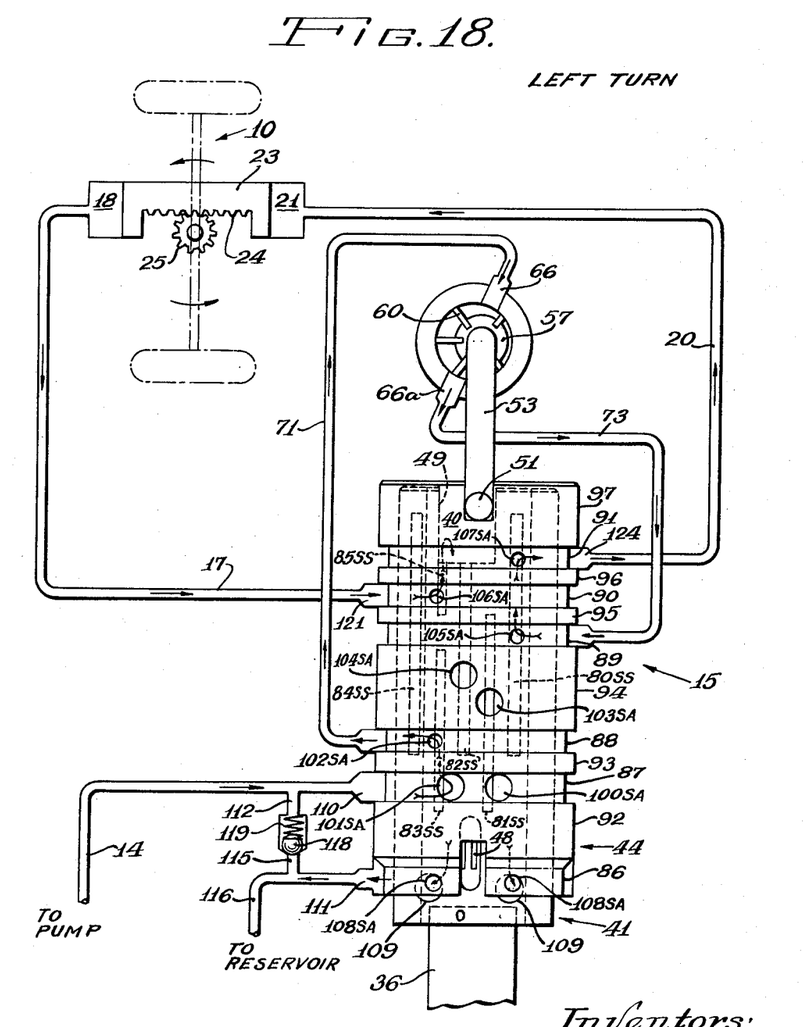

Assume next that hydraulic pressure is still available from gear pump 11 and that a left turn of the steerable wheels away from the neutral or straight-ahead position thereof is desired. In such instance a counterclockwise turning of the operator's hand wheel 35 will rotate the connected shaft 36 which, through pin 42, rotates the spool 41 to start loading the leaf spring 48. After a rotation of approximately eight degrees by the spool, said spring is loaded against the sleeve 44 which sleeve normally is constrained against rotation by the rotor 57 operatively connected thereto by the pin 51 and shaft 53. At this time the relative positions of the various communicating passages and openings in the sleeve and spool members will have been moved from the normally neutral position thereof and assumed the relationship illustrated schematically in FIG. 18, subsequent, of course, to completion of the initial eight degree movement therebetween. Reference still being had to FIG. 18, it will be seen that fluid flow from inlet port 110 is directed into sleeve groove 87 and through radial openings passage means 101SA into spool passage means 83SS, thence through radial openings passage means 102SA into sleeve groove 88, passage 71 and into rotor unit 57, where the pressure starts its build-up on the opposite side from that previously mentioned until it becomes sufficient to start rotation of said rotor in an opposite direction. As said rotor unit rotates, fluid under pressure is discharged from the opposite side thereof through the passage 73, sleeve groove 89, radial openings passage means 105SA, spool passage means 80SS, radial openings passage means 107SA, sleeve groove 91, work port 124 and conduit 20 into hydraulic cylinder chamber 21 thereby causing the piston 23 therein to slidably move and, through the rack gear 24 and meshing gear 25, to effect a turning of the steerable wheel assembly 10 in a counterclockwise direction as desired. As the piston 23 slidably moves in cylinder 22, fluid is displaced out of chamber 18 thereof and transmitted by way of conduit 17 through work port 121, thence the sleeve groove 90, radial openings passage means 106SA, spool passage means 85SS, into the hollow interior 40 of spool 41, and out through openings 109 and radial openings passage means 108SA into sleeve groove 86 and thereafter through the exhaust port 111 and conduit 16 back to the fluid reservoir 13. As previously explained, in connection with the right turn sequence of operations, when the rotor 57 is rotated without corresponding rotation of the operator's control wheel the spring 48 is unloaded whereupon such movement operates to effect a repositioning of the relative positions of the spool and sleeve passages and openings such that a neutral condition in the control valve unit is reestablished. Further counterclockwise turning of the operator's hand wheel 35 will, of course, effect a repetition of the operational sequence most recently enumerated.

It will be noted that the direction of fluid in the passages 71 and 73 is reversible, depending upon the direction of turn of the control wheel 35, and since these passages provide the fluid connections to the hydraulic motor 15B they are frequently referred to as the reversible fluid flow ports for said motor unit.

*Right Turn (External Hydraulic Pressure Not Available)*

Let us assume now that the hydraulic gear pump 11 of the vehicle for some reason or other is not operating to provide fluid pressure, such as when the vehicle is at rest and the engine thereof is stopped, and it is desired to turn the steerable wheels thereof to the right and away from a neutral or straight-ahead position. In this case the sequence of operation will be almost identical to that heretofore detailed in connection with a right turn when external hydraulic pressure was available. In the present instance, however, when the operator's hand wheel 35 is turned the spool 41 and sleeve 44 will rotate, as before, but since there is no pressure in the conduit 14 or in the passage 73 that communicates with one side of the rotor 57 there will be no pressure build-up therein capable of rotating said rotor and causing the motor unit to operate in its normal fashion as a metering motor. Instead the rotation of the sleeve 44, acing through the interconnected pin 51 and shaft 53, will effect rotation of the rotor 57 in a one-to-one ratio thereby forcing this hydraulic motor unit to act as a hydraulic pump and displace fluid under pressure therefrom and through the oppositely positioned passage 71 after which said fluid follows the previously described flow sequence into the cylinder chamber 18 to slidably move the piston 23 and turn the wheels as desired. The fluid thus displaced from cylinder chamber 21, at the opposite end of cylinder 22, then follows the same flow sequence previously described in connection with a right turn until it reaches the outlet or exhaust port 111. At this point, in the present instance, the fluid, instead of returning to the fluid reservoir 13 by way of the latter port and conduit 16, passes into the extension passage 115 and the pressure thereof unseats the ball valve 118 from its seat against the reaction of spring 119. Thereafter the fluid flows into the passage 112, associated with inlet port 110, to begin once again the cycle through the hydraulic circuit of the control unit. When the turning effort on the shaft 53 is reduced by the operator rotation of rotor unit 57 is correspondingly reduced and fluid delivered to the cylinder chamber 18 will be correspondingly limited. However, the steerable wheels will maintain their new position until all effort by the operator is removed from shaft 53 and the valve elements returned to their neutral positions. At this point the assembly will then be able to return to a straight-ahead position of the wheels because of the castor geometry, as previously mentioned, of said mechanism.

*Left Turn (External Hydraulic Pressure Not Available)*

Next we assume that fluid pressure from the hydraulic gear pump 11 is not available and a left turn is desired. In this case the sequence of operations will be almost identical with that outlined for a left turn when external hydraulic pressure was available. In the present instance, however, when the operator's hand wheel 35 is turned the spool 41 and sleeve 44 will rotate, as before, but since there is no pressure in the conduit 14 or in the passage 71 that communicates with one side of the rotor 57 there will be no pressure build-up therein capable of rotating said rotor and causing the motor unit to operate in its normal fashion as a metering motor. Instead the rotation of the sleeve 44, acting through the interconnected pin 51 and shaft 53, will effect rotation of the rotor 57 in a one-to-one ratio thereby forcing this hydraulic motor unit to act as a hydraulic pump and displace fluid under pressure therefrom and through the oppositely positioned passage 73 after which said fluid follows the previously described flow sequence into the cylinder chamber 21 to slidably move the piston 23 and turn the wheels in the direction desired. The fluid thus displaced from cylinder chamber 18, at the opposite end of cylinder 22, then follows the same flow sequence previously outlined in connection with a left turn until it reaches the outlet or exhaust port 111. At this point, in the latest instance, the fluid, instead of returning to the fluid reservoir 13 by way of this latter port and conduit 16, passes into the extension passage 115 and the pressure thereof unseats the ball valve 118 and thereafter the fluid flows into the passage 112, associated with inlet port 110, to resume its cycling through the hydraulic circuit. When the turning effort on the shaft 53 is reduced by the operator rotation of rotor unit 57 is correspondingly reduced and fluid delivered to the cylinder chamber 21 will be proportionately limited. However, the steerable wheels will maintain their new position until all effort by the operator is removed from the operator's wheel and shaft and the valve elements are returned to their neutral positions. At this time the assembly will then be able to return to a straight-ahead position of the wheels as previously mentioned.

It should now be apparent that a novel full fluid power steering assembly has been shown and described, and it is to be understood that changes may be made in the construction without departing from the spirit of the invention or the scope thereof as defined in the appended claims.

We claim:

1. In a vehicle hydraulic steering system having steerable wheels, a steering control wheel operated hydraulic valve means, said valve means including a hydraulic motor having oppositely disposed reversible fluid flow ports, a source of hydraulic fluid pressure communicatively connected to said valve means, a servo-motor having end chambers and adapted for driving coupling to the steerable wheels and communicatively connected to said valve means, said valve means being formed to deliver fluid under pressure from said source to one of said reversible flow ports of said hydraulic motor and from the opposite one of said reversible flow ports of said hydraulic motor to one end chamber of said servo-motor while venting another one of said end chambers of said servo-motor when said steering control wheel is turned in one direction from a neutral position and to deliver fluid under pressure from said source to the opposite one of said reversible flow ports of said hydraulic motor and from the said one of said reversible flow ports of said hydraulic motor to the said another one of said end chambers of said servo-motor while venting the said one of said end chambers of said servo-motor when said steering control wheel is turned in an opposite direction from a neutral position, said valve means being further formed so that the said end chambers of said servo-motor are communicatively interconnected with one another through said hydraulic motor when said steering control wheel is in a neutral position.

2. In a vehicle hydraulic steering system having steerable wheels, a steering control wheel operated hydraulic valve means, said valve means including a mechanically interconnected hydraulic motor having oppositely disposed reversible fluid flow ports and being alternatively operable as a hydraulic pump, a source of hydraulic fluid pressure communicatively connected to said valve means, a servo-motor having opposite end chambers adapted for driving coupling to the steerable wheels and communicatively connected to said valve means, said valve means being formed to deliver fluid under pressure from said source to one of said reversible flow ports of said hydraulic motor and from the opposite one of said reversible flow ports of said hydraulic motor to one of said end chambers of said servo-motor while venting the opposite one of said end chambers of said servo-motor when said steering control wheel is turned in one direction from a neutral position and to deliver fluid under pressure from said source to said opposite one of said reversible flow ports of said hydraulic motor and from the said one of said reversible flow ports of said hydraulic motor to said opposite one of said end chambers of said servo-motor while venting the said one of said end chambers of said servo-motor when said steering control wheel is turned in an opposite direction from a neutral position, and to communicatively interconnect said opposite end chambers of said servo-motor with one another through said hydraulic motor when said steering control wheel is in a neutral position, said hydraulic motor being operative as a hydraulic pump when turned by movement of said steering control wheel for delivering fluid alternatively to said opposite end chambers of said servo-motor in event of failure of said source of fluid pressure.

3. In a control for a hydraulic servo-motor having a cylinder with opposite end chambers and with a piston reciprocally mounted therewithin, in combination: a housing having work ports adapted for connection, respectively, with the opposite end chambers of the cylinder of said servo-motor, and having inlet and exhaust ports adapted for connection, respectively, with different portions of a hydraulic fluid pressure circuit; said housing being provided with a bore therein and having concentrically arranged valve elements rotatably disposed therein; means formed in said valve elements defining passageways for the transmission of fluid therethrough; said valve elements being selectively operable for controlling the passage of fluid through said passageways and to effect fluid communication between predetermined ports of said housing; said valve elements being formed so that in one position thereof free fluid communication is established between the work ports thereof while concurrently fluid communication is established between the inlet and exhaust ports thereof.

4. In a control for a hydraulic servo-motor having a cylinder with opposite end chambers and with a piston reciprocally mounted therewithin, in combination; a housing having a bore therein and work ports communicating with the interior of said bore and adapted for connection, respectively, with the opposite end chambers of the cylinder of said servo-motor, and having inlet and exhaust ports communicating with the interior of said bore and adapted for connecting, respectively, with different portions of a hydraulic fluid pressure circuit; two tubular valve elements concentrically arranged and rotatably disposed in said bore; means formed in said valve elements defining axially and radially extending passageways in one of said valve elements, and radially and annularly extending passageways in the other one of said valve elements for the transmission of fluid therethrough; a hydraulic motor having oppositely disposed reversible fluid flow ports and being connected to an outer one of said concentrically arranged valve elements and constrained for operation therewith; means defining passageways for the transmission of fluid between said oppositely disposed reversible flow ports of said hydraulic motor and the interior of said bore; said valve elements being formed so that in one predetermined position thereof certain of said passageways are cooperatively registrable with certain other of said passageways for establishing fluid communication from said inlet port to one of said reversible flow ports of said hydraulic motor and from the opposite one of said reversible flow ports of said hydraulic motor to one of said work ports while concurrently establishing fluid communication between another one of said work ports and said exhaust port, and in another position for establishing fluid communication from said inlet port to the opposite one of said reversible flow ports of said hydraulic motor and from the said one of said reversible flow ports of said hydraulic motor to the said another one of said work ports while concurrently establishing fluid communication between the said one of said work ports and said exhaust port, and in a neutral position for establishing fluid communication from one of said ports to said opposite one of said reversible flow ports of said hydraulic motor and from the said one of said reversible flow ports of said hydraulic motor to the said another one of said work ports while concurrently establishing fluid communication between said inlet and exhaust ports.

5. In a control for a hydraulic servo-motor having a cylinder with opposite end chambers and with a piston reciprocally mounted therewithin, in combination: a housing having a bore therein and work ports communicating with the interior of said bore and adapted for connection, respectively, with opposite ends of the cylinder of said servo-motor, and having inlet and exhaust ports communicating with the interior of said bore and adapted for connection, respectively, with different portions of a hydraulic fluid pressure circuit; a plurality of tubular valve elements concentrically arranged and rotatably disposed in said bore; yieldable means drivingly interconnecting said valve elements and normally urging one of said elements into a neutral position relative to another one of said elements, and being further arranged so that a predetermined amount of rotational movement from a neutral position of either of said elements relative to the other thereof is permitted before effecting rotational movement of the other of said elements; means formed in one of said valve elements defining in cooperation with said another one of said elements axially and radially extending passageways, and means formed in the said another one of said valve elements defining in cooperation with the interior surface of said bore radially and annularly extending passageways for the transmission of fluid through the elements; a hydraulic motor having oppositely disposed reversible fluid flow ports and being connected to and constrained for rotation with one of said valve elements; means defining passageways for the transmission of fluid between the oppositely disposed reversible flow ports of said hydraulic motor and the interior of said bore; said valve elements being arranged so that in one position thereof attained after movement of one of said elements relative to another one thereof said predetermined amount from a neutral position certain of said passageways are cooperatively registrable with certain others of said passageways for establishing fluid communication from said inlet port to one of said reversible flow ports of said hydraulic motor and from the opposite one of said reversible flow ports of said hydraulic motor to one of said work ports while concurrently establishing fluid communication between another one of said work ports and said exhaust port, and in another position attained after movement in an opposite direction from a neutral of one of said elements relative to the other thereof said predetermined amount for establishing fluid communication from said inlet port to the opposite one of said reversible flow ports of said hydraulic motor and from the said one of reversible flow ports of said hydraulic motor to another one of said work ports while concurrently establishing fluid communication between the said one of said work ports and said exhaust port, and in a neutral position attained by reducing the relative rotative displacement between said valve elements substantially to zero for establishing fluid communication from one of the said work ports to said opposite one of said reversible flow ports of said hydraulic motor and from the said one of said reversible flow ports of said hydraulic motor to the said another one of said work ports while concurrently establishing fluid communcation between said inlet and exhaust ports.

6. The structure described in claim 5 and further characterized in that: said axially extending passageways in said valve elements are each formed to include a plurality of at least four separate axially extending circumferentially spaced and parallel slot-like recesses, and said radially extending passageways are each formed to include at least four separate circumferentially spaced apertures.

7. In a control for a hydraulic servo-motor having a cylinder with opposite end chambers and with a piston reciprocally mounted therewithin, in combination: a housing having a bore therein and work ports communicating with the interior of said bore and adapted for connection, respectively, with the opposite end chambers of the cylinder of said servo-motor, and having inlet and exhaust ports communicating with the interior of said bore and adapted for connection, respectively, with different portions of a hydraulic fluid pressure circuit; outer and inner tubular valve elements concentrically arranged and rotatably disposed in said bore; means formed in said outer valve element defining in cooperation with the interior surface of said bore radially and annularly extending passageways for the transmission of fluid, and means formed in said inner valve element defining in cooperation with said outer element axially and radially extending passageways for the transmission of fluid, said annularly extending passageways being formed in the peripheral surface of said outer valve element and said axially extending passageways being formed in the outer peripheral surface of said inner valve element; said valve elements being formed so that in one positon thereof certain of said axially and radially extending passageways are registrable with one another and with certain of said ports for establishing fluid communication from said inlet port to one of said work ports while concurrently fluid communication is established between said another one of said work ports and said exhaust port, and in another position for establishing fluid communication from said inlet port to said another one of said work ports while concurrently establishing fluid communication between the said one of said work ports and said exhaust port, and in a neutral position for establishing fluid communication between the said one and said another one of said work ports while concurrently establishing fluid communication between said inlet and said exhaust ports.

References Cited in the file of this patent
UNITED STATES PATENTS

| | | |
|---|---|---|
| 1,773,794 | Schneider | Aug. 26, 1930 |
| 1,872,714 | Farley | Aug. 23, 1932 |
| 2,020,951 | Lemon | Nov. 12, 1935 |
| 2,321,377 | French | June 8, 1943 |
| 2,368,135 | Hamill | Jan. 30, 1945 |
| 2,411,119 | Stephens | Nov. 12, 1946 |
| 2,506,093 | MacDuff | May 2, 1950 |
| 2,796,945 | Dye et al. | June 25, 1957 |